(12) United States Patent
Brinson et al.

(10) Patent No.: US 7,539,389 B2
(45) Date of Patent: *May 26, 2009

(54) RETENTION AND ROTATION CLAMP ASSEMBLY FOR USE WITH AN ANGLED OPTICAL FIBER CLEAVER

(75) Inventors: Jonathan Michael Brinson, White Settlement, TX (US); Joshua Douglas Raker, Lewisville, TX (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 12/069,244

(22) Filed: Feb. 8, 2008

(65) Prior Publication Data

US 2008/0240666 A1    Oct. 2, 2008

Related U.S. Application Data

(63) Continuation of application No. 11/729,628, filed on Mar. 29, 2007, now Pat. No. 7,428,365.

(51) Int. Cl.
G02B 6/255    (2006.01)
G02B 6/00     (2006.01)

(52) U.S. Cl. .................. 385/137; 385/95; 385/134; 385/136; 385/147

(58) Field of Classification Search ............. 385/137, 385/95, 134, 136, 147
See application file for complete search history.

(56) References Cited

U.S. PATENT DOCUMENTS

| | | | |
|---|---|---|---|
| 4,619,387 A | 10/1986 | Shank | 299/96.5 |
| 4,976,390 A | 12/1990 | Gee et al. | 225/96 |
| 5,031,321 A | 7/1991 | Briscoe | 30/134 |
| 5,048,908 A * | 9/1991 | Blonder et al. | 385/39 |
| 5,351,333 A | 9/1994 | Chambers | 385/134 |
| 5,501,385 A | 3/1996 | Halpin | 225/96 |
| 5,839,635 A | 11/1998 | Mansfield | 225/96.5 |
| 6,510,271 B1 | 1/2003 | Beldycki | 385/134 |
| 6,634,079 B1 | 10/2003 | Kazama | 29/564.4 |
| 6,688,207 B2 | 2/2004 | Tabeling | 83/679 |
| 6,695,191 B1 | 2/2004 | Tabeling | 225/95 |
| 6,901,199 B2 | 5/2005 | Tabeling | 385/134 |
| 6,978,071 B2 | 12/2005 | Hwang et al. | 385/134 |
| 7,025,239 B2 | 4/2006 | Itano et al. | 225/95 |
| 7,140,782 B2 | 11/2006 | Frohlich et al. | 385/53 |
| 7,142,763 B2 | 11/2006 | Frohlich et al. | 385/135 |
| 7,255,484 B2 * | 8/2007 | Walker et al. | 385/53 |
| 2006/0263028 A1 | 11/2006 | Honma | 385/134 |

* cited by examiner

*Primary Examiner*—Frank G Font
*Assistant Examiner*—Jerry Blevins
(74) *Attorney, Agent, or Firm*—Susan S. Wilks

(57) ABSTRACT

The present invention relates generally to an angled optical fiber cleaver that is used to cleave optical fibers prior to mechanical splicing and that provides a desired optical fiber endface angle. More specifically, the present invention relates to an angled optical fiber cleaver that incorporates a novel retention and rotation clamp assembly that successively engages, securely holds, and rotates an optical fiber prior to cleaving, this rotation providing the desired optical fiber endface angle. Advantageously, the novel retention and rotation and clamp assembly of the present invention is actuated via a single linear button press/release, eliminating the cumbersome steps associated with conventional devices and methodologies.

15 Claims, 5 Drawing Sheets

RETENTION AND ROTATION CLAMP ASSEMBLY FOR USE WITH AN ANGLED OPTICAL FIBER CLEAVER

This is a continuation of application Ser. No. 11/729,628, filed Mar. 29, 2007 now U.S. Pat. No. 7,428,365.

BACKGROUND OF THE INVENTION

1. Field of the Invention

The present invention relates generally to an angled optical fiber cleaver that is used to cleave optical fibers prior to mechanical splicing and that provides a desired optical fiber endface angle. More specifically, the present invention relates to an angled optical fiber cleaver that incorporates a novel retention and rotation clamp assembly that successively engages, securely holds, and rotates an optical fiber prior to cleaving, this rotation providing the desired optical fiber endface angle. Advantageously, the novel retention and rotation and clamp assembly of the present invention is actuated via a single linear button press/release, eliminating the cumbersome steps associated with conventional devices and methodologies.

2. Technical Background of the Invention

Mechanical splice connectors typically require that the spliced optical fibers connected thereby, such as 125 µm optical fibers or the like, each have a substantially flat endface. The object of this type of splice is to minimize the dB loss present. In order to minimize the reflectance present, it is preferable that the endface of each of the spliced optical fibers is angled.

Mechanical cleaving in the substantially flat endface case is typically performed in one of two ways: 1) a flaw is induced in the surface of the optical fiber and, subsequently, a stress is applied to the optical fiber, or 2) conversely, a stress is applied to the optical fiber and, subsequently, a flaw is induced in the surface of the optical fiber. Mechanical cleaving in the angled endface case is typically performed by rotating the optical fiber before it is cleaved.

Conventional angled optical fiber cleaving devices and methodologies incorporate multiple components and steps to achieve this retention, rotation, and cleaving. A fiber handler is typically required to hold the optical fiber, a clamp is required to retain the optical fiber, a mechanism is required to stress the optical fiber, and another mechanism is required to induce the flaw in the surface of the optical fiber. This complexity makes such angled optical fiber cleaving devices cumbersome to use and maintain.

Thus, what is needed in the art is an angled optical fiber cleaver that incorporates a novel retention and rotation clamp assembly that successively engages, securely holds, and rotates an optical fiber prior to cleaving, this rotation providing the desired optical fiber endface angle.

BRIEF SUMMARY OF THE INVENTION

In various embodiments, the present invention provides an angled optical fiber cleaver that incorporates a novel retention and rotation clamp assembly that successively engages, securely holds, and rotates an optical fiber prior to cleaving, this rotation providing the desired optical fiber endface angle. Advantageously, the novel retention and rotation and clamp assembly of the present invention is actuated via a single linear button press/release, eliminating the cumbersome steps associated with conventional devices and methodologies.

In one embodiment, the present invention provides an angled optical fiber cleaver device operable for cleaving an optical fiber and providing an angled optical fiber endface, the angled optical fiber cleaver device including: a retention and rotation clamp assembly operable for successively retaining and rotating an optical fiber with a single actuation motion by a user; and a cleaving assembly operable for cleaving the optical fiber. The retention and rotation clamp assembly includes: a fiber clamping arm in a first vertical position when the retention and rotation clamp assembly is in a first actuation state; and a main clamping arm in a first angled position biased away from the fiber clamping arm and biased away from a body of the angled optical fiber cleaver device when the retention and rotation clamp assembly is in the first actuation state; wherein, in the first actuation state, the fiber clamping arm and the main clamping arm are configured to receive the optical fiber. The retention and rotation clamp assembly also includes: the fiber clamping arm in a first angled position when the retention and rotation clamp assembly is in a second actuation state; and the main clamping arm in the first angled position no longer biased away from the fiber clamping arm and still biased away from a body of the angled optical fiber cleaver device when the retention and rotation clamp assembly is in the second actuation state; wherein, in the second actuation state, the fiber clamping arm and the main clamping arm are configured to securely retain the optical fiber. The retention and rotation clamp assembly further includes: the fiber clamping arm in a second vertical position when the retention and rotation clamp assembly is in a third actuation state; and the main clamping arm in the first vertical position still no longer biased away from the fiber clamping arm and no longer biased away from a body of the angled optical fiber cleaver device when the retention and rotation clamp assembly is in the third actuation state; wherein, in the third actuation state, the fiber clamping arm and the main clamping arm are configured to rotate the securely retained optical fiber. Optionally, the single actuation motion by the user comprises a single linear actuation motion by the user. Preferably, the angled optical fiber cleaver device is operable for successively retaining, rotating, and cleaving the optical fiber.

In another embodiment, the present invention provides an angled optical fiber cleaver device operable for cleaving an optical fiber and providing an angled optical fiber endface, the angled optical fiber cleaver device including: a retention and rotation clamp assembly operable for successively retaining and rotating an optical fiber with a single actuation motion by a user, wherein the retention and rotation clamp assembly includes: a fiber clamping arm disposed adjacent to a main clamping arm; and a clamp press operable for selectively biasing the fiber clamping arm directly adjacent to the main clamping arm in one of a vertical or angled position; and a cleaving assembly operable for cleaving the optical fiber. The retention and rotation clamp assembly also includes: the fiber clamping arm in a first vertical position when the retention and rotation clamp assembly is in a first actuation state; and the main clamping arm in a first angled position biased away from the fiber clamping arm and biased away from a body of the angled optical fiber cleaver device when the retention and rotation clamp assembly is in the first actuation state; wherein, in the first actuation state, the fiber clamping arm and the main clamping arm are configured to receive the optical fiber. The retention and rotation clamp assembly further includes the fiber clamping arm in a first angled position when the retention and rotation clamp assembly is in a second actuation state; and the main clamping arm in the first angled position no longer biased away from the fiber clamping arm and still biased away from a body of the angled optical fiber cleaver device when the retention and rotation clamp assembly is in the second actuation state; wherein, in the second actuation state, the fiber clamping arm and the main clamping arm are configured to securely retain the optical fiber. The retention and rotation clamp assembly still further includes: the fiber clamping arm in a second vertical position when the retention and rotation clamp assembly is in a third actuation state; and the main clamping arm in the first vertical position still no longer biased away from the fiber clamping arm and no longer biased away from a body of the angled optical fiber cleaver device when the retention and rotation clamp assembly is in the third actuation state; wherein, in the third actuation state, the fiber clamping arm and the main clamping arm are configured to rotate the securely retained optical fiber. Optionally, the single actuation motion by the user comprises a single linear actuation motion by the user. Preferably, the angled optical fiber cleaver device is operable for successively retaining, rotating, and cleaving the optical fiber.

In a further embodiment, the present invention provides an angled optical fiber cleaving method for cleaving an optical fiber and providing an angled optical fiber endface, the angled optical fiber cleaving method including: providing a retention and rotation clamp assembly operable for successively retaining and rotating an optical fiber with a single actuation motion by a user; and providing a cleaving assembly operable for cleaving the optical fiber. Providing the retention and rotation clamp assembly includes: providing a fiber clamping arm in a first vertical position when the retention and rotation clamp assembly is in a first actuation state; and providing a main clamping arm in a first angled position biased away from the fiber clamping arm and biased away from a body of the angled optical fiber cleaver device when the retention and rotation clamp assembly is in the first actuation state; wherein, in the first actuation state, the fiber clamping arm and the main clamping arm are configured to receive the optical fiber. Providing the retention and rotation clamp assembly also includes: providing the fiber clamping arm in a first angled position when the retention and rotation clamp assembly is in a second actuation state; and providing the main clamping arm in the first angled position no longer biased away from the fiber clamping arm and still biased away from a body of the angled optical fiber cleaver device when the retention and rotation clamp assembly is in the second actuation state; wherein, in the second actuation state, the fiber clamping arm and the main clamping arm are configured to securely retain the optical fiber. Providing the retention and rotation clamp assembly further includes: providing the fiber clamping arm in a second vertical position when the retention and rotation clamp assembly is in a third actuation state; and providing the main clamping arm in the first vertical position still no longer biased away from the fiber clamping arm and no longer biased away from a body of the angled optical fiber cleaver device when the retention and rotation clamp assembly is in the third actuation state; wherein, in the third actuation state, the fiber clamping arm and the main clamping arm are configured to rotate the securely retained optical fiber. Optionally, the single actuation motion by the user comprises a single linear actuation motion by the user. Preferably, the angled optical fiber cleaving method is for successively retaining, rotating, and cleaving the optical fiber.

It is to be understood that both the foregoing general description and the following detailed description provide exemplary embodiments of the present invention, and an overview or framework for understanding the nature and character of the present invention as it is claimed. The accompanying drawings are included in order to provide a further understanding of the present invention, and are incorporated into and constitute a part of this specification. The accompanying drawings illustrate the various exemplary embodiments of the present invention, and together with the detailed description, serve to explain the principles of operation thereof. The accompanying drawings are meant to be illustrative, and not limiting.

BRIEF DESCRIPTION OF THE DRAWINGS

The present invention is illustrated and described herein with reference to the various drawings, in which like reference numbers are used to denote like device components and/or method steps, as appropriate, and in which.

DETAILED DESCRIPTION OF THE INVENTION

In various embodiments, the present invention provides an angled optical fiber cleaver that incorporates a novel retention and rotation clamp assembly that successively engages, securely holds, and rotates an optical fiber prior to cleaving, this rotation providing the desired optical fiber endface angle. Advantageously, the novel retention and rotation and clamp assembly of the present invention is actuated via a single linear button press/release, eliminating the cumbersome steps associated with conventional devices and methodologies.

Figure 1:
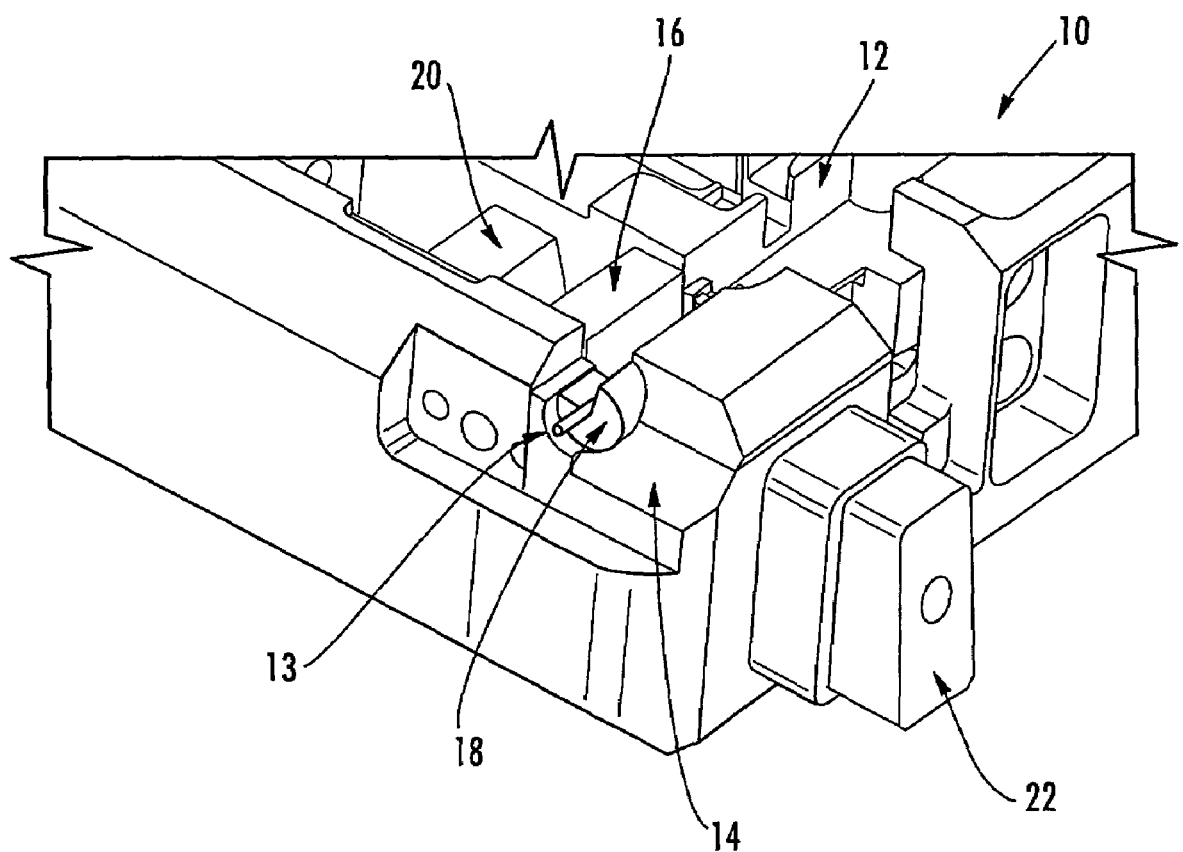
FIG. 1 is a partial perspective view illustrating one embodiment of the angled optical fiber cleaver incorporating the novel retention and rotation clamp of the present invention.

Referring to FIG. 1, in one embodiment, the angled optical fiber cleaver 10 of the present invention includes a channel 12 configured to receive an optical fiber 13 and a retention and rotation clamp assembly 14 that is disposed partially within the channel 12, the retention and rotation clamp assembly 14 operable for selectively retaining and rotating the optical fiber 13. As is described in greater detail herein below, the retention and rotation clamp assembly 14 includes a fiber clamping arm 16, a main clamping arm 18, a clamp press 20, and an actuation button 22, among other components. The angled optical fiber cleaver 10 also includes other components, well known to those of ordinary skill in the art and not described herein for the sake of brevity, including, but not limited to, a scoring blade (not illustrated).

Figure 2:
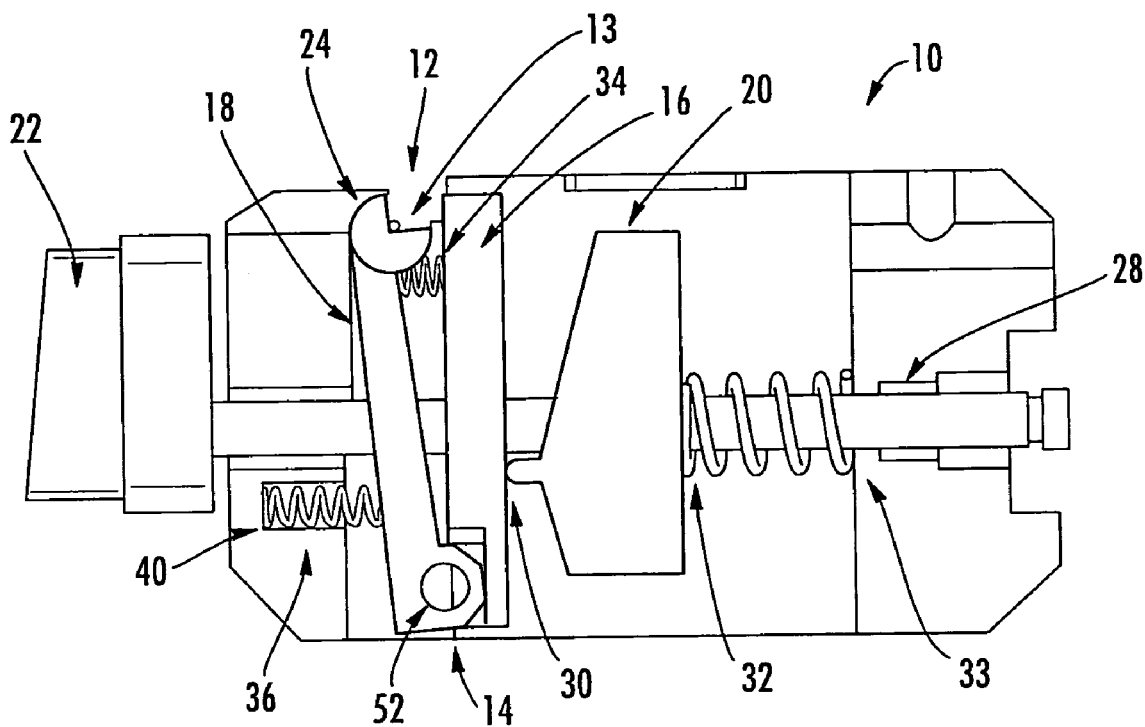
FIG. 2 is a planar side view illustrating the operation of the novel retention and rotation clamp of FIG. 1, the retention and rotation clamp in an open configuration.

Referring to FIG. 2, the retention and rotation clamp assembly 14 is disposed substantially within the body of the angled optical fiber cleaver 10. The main clamping arm 18 is hingedly connected to the fiber clamping arm 16 at the lower end of each, making the main clamping arm 18 and the fiber clamping arm pivotable with respect to one another. The upper end of the main clamping arm 18 includes a substantially cylindrical portion 24 that forms a notched seat that is configured to receive the optical fiber 13. The configuration of the main clamping arm is described in greater detail herein below with reference to FIG. 5. The substantially cylindrical portion 24 of the main clamping arm 18 engages a corresponding substantially curved shoulder 25 manufactured into the interior of the body of the angled optical fiber cleaver 10. The fiber clamping arm 16 has a substantially rectangular shape. Both the main clamping arm 18 and the fiber clamping arm 16 include a bore 26 (FIGS. 5 and 6) running through their center portions at corresponding locations. These bores 26 are sized to receive a shaft 28 that runs through the body of the angled optical fiber cleaver 10, the inside diameters of the bores 26 being slightly larger than the outside diameter of the shaft 28, such that the main clamping arm 18 and the fiber clamping arm 16 are free to float on the shaft 28. One end of the shaft 28 is coupled to the actuation button 22 and the shaft 28 moves linearly through the body of the angled optical fiber cleaver 10 when actuated. The clamp press 20 is fixedly connected to the shaft 28 adjacent to the fiber clamping arm 16. The clamp press 20 includes a fiber clamping arm engagement finger 30 configured to selectively engage the fiber clamping arm 16 as the shaft 28 is actuated, thereby deflecting the fiber clamping arm 16 about the main clamping arm-fiber clamping arm joint. The clamp press 20 is biased against actuation by a main spring 32 that engages a shoulder 33 manufactured into the interior of the body of the angled optical fiber cleaver 10. Likewise, the main clamping arm 18 and the fiber clamping arm 16 are biased against one another by a clamp spring 34 disposed there between. The clamp spring 34 is seated in corresponding recesses 38 (FIGS. 5 and 6) manufactured into the facing surfaces of the main clamping arm 18 and the fiber clamping arm 16. Finally, the main clamping arm 18 is biased against the interior of the body of the angled optical fiber cleaver 10 by a rotation spring 36 that is seated in corresponding recesses 40 manufactured into the interior of the body of the angled optical fiber cleaver 10 and the facing surface of the main clamping arm 18.

In the open configuration illustrated, the actuation button 22 is fully depressed, with the fiber clamping arm 16 in a stowed (first vertical) position, fully engaged by the clamp press 20, the main clamping arm 18 biased away from the fiber clamping arm 16, and the main clamping arm 18 biased away from the interior of the body of the angled optical fiber cleaver 10. In this configuration, the retention and rotation clamp assembly 14 is fully open and un-rotated, and the optical fiber 13 may be inserted into the seat of the substantially cylindrical portion 24 of the main clamping body 18.

Figure 3:
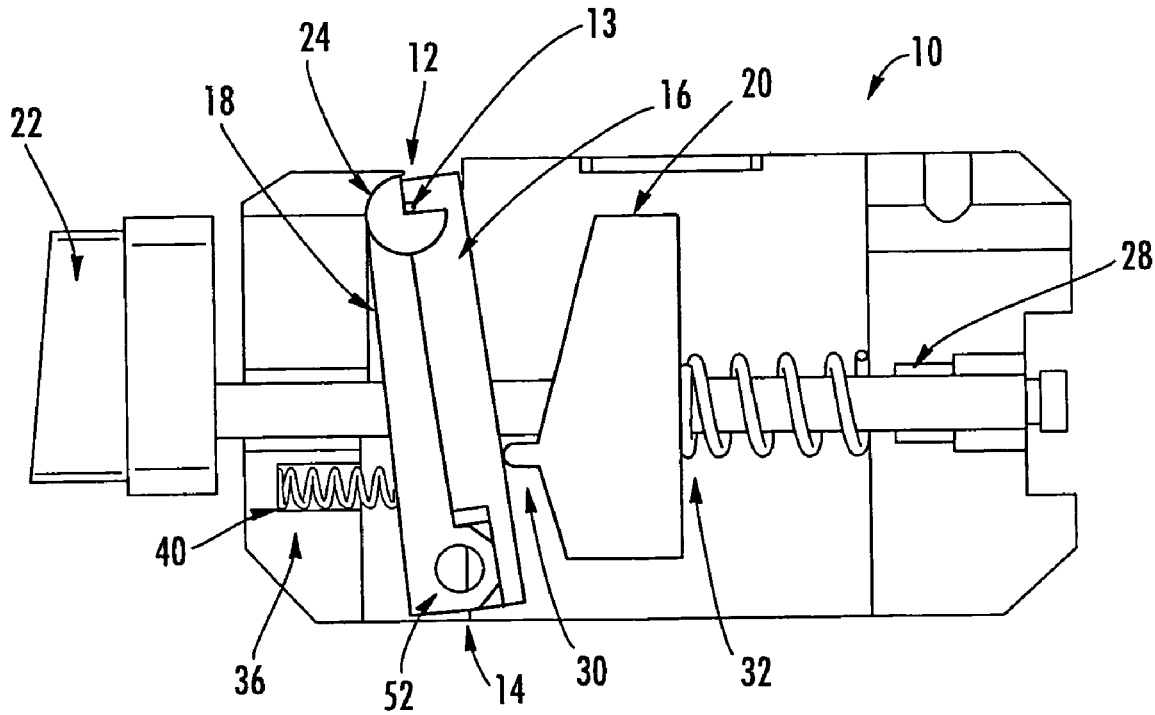
FIG. 3 is a planar side view illustrating the operation of the novel retention and rotation clamp of FIGS. 1 and 2, the retention and rotation clamp in a closed configuration.

Referring to FIG. 3, in the subsequent closed configuration illustrated, the actuation button 22 is only partially depressed, with the fiber clamping arm 16 in a deployed (angled) position, no longer engaged by the clamp press 20, the main clamping arm 18 no longer biased away from the fiber clamping arm 16, but the main clamping arm 18 still biased away from the interior of the body of the angled optical fiber cleaver 10. In this configuration, the retention and rotation clamp assembly 14 is fully closed but still un-rotated, and the optical fiber 13 is retained securely in the retention and rotation clamp assembly 14.

Figure 4:
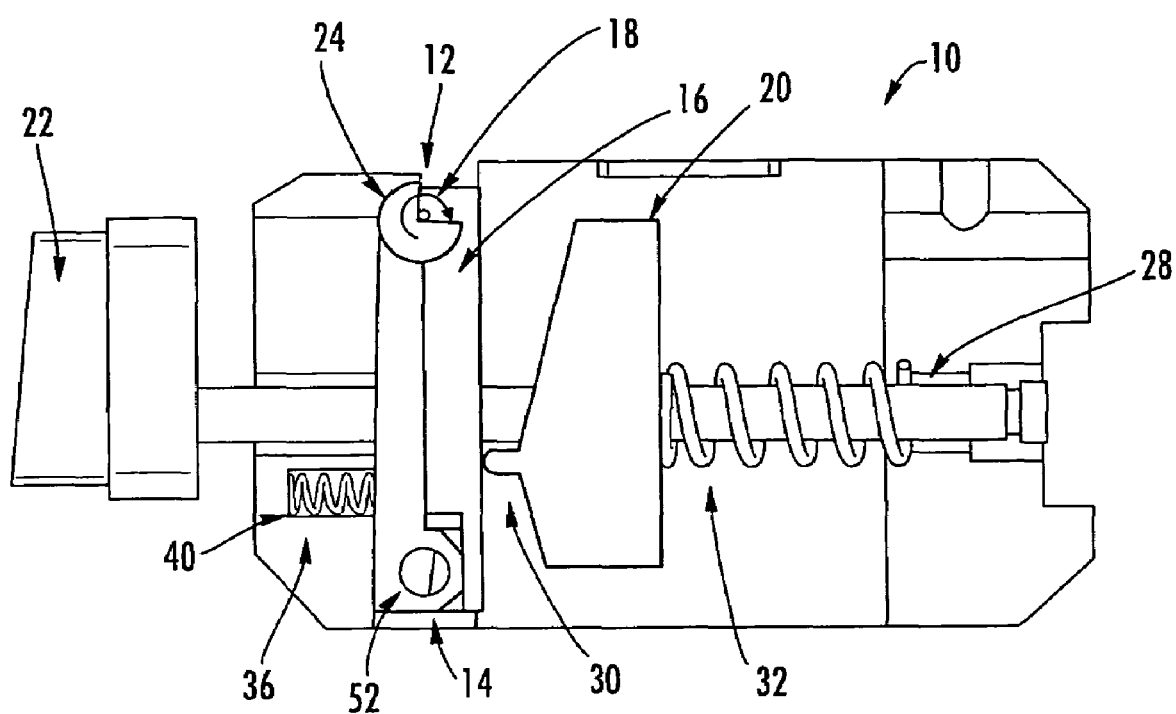
FIG. 4 is a planar side view illustrating the operation of the novel retention and rotation clamp of FIGS. 1-3, the retention and rotation clamp in a closed and rotated configuration.

Referring to FIG. 4, in the subsequent closed and rotated configuration illustrated, the actuation button 22 is un-depressed, with the fiber clamping arm 16 in an un-deployed (second vertical) position, still no longer engaged by the clamp press 20, the main clamping arm 18 still no longer biased away from the fiber clamping arm 16, the main clamping arm 18 no longer biased away from the interior of the body of the angled optical fiber cleaver 10. In this configuration, the retention and rotation clamp assembly 14 is fully closed and rotated, and the optical fiber 13 is retained securely in the retention and rotation clamp assembly 14 and rotated.

Figure 5:
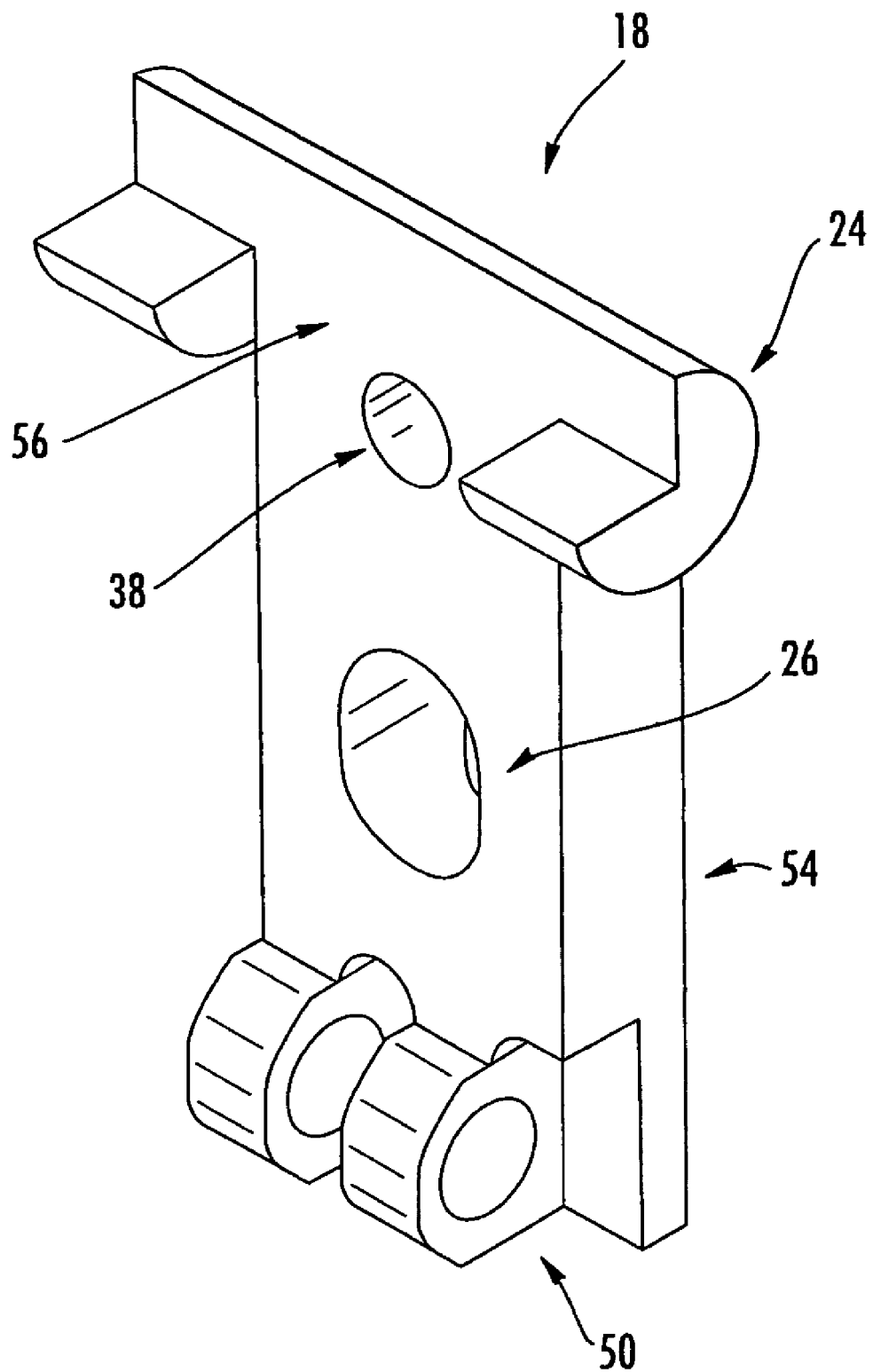
FIG. 5 is an isolated perspective view illustrating one embodiment of the main clamping arm associated with the retention and rotation clamp of FIGS. 1-4.

Referring to FIG. 5, the main clamping arm 18 of the angled optical fiber cleaver 10 (FIGS. 1-4) of the present invention includes a pair of pin-receiving holes 50 at its lower end, where the main clamping arm 18 is hingedly connected to the fiber clamping arm 16 (FIGS. 1-4 and 6) via a pin 52 (FIGS. 2-4). The main clamping arm 18 also includes a center portion 54 defining the bore 26 and recess 38 described above. The upper end of the main clamping arm 18 includes the substantially cylindrical portion 24 that forms a notched seat that is configured to receive the optical fiber 13 (FIGS. 1-4). In the embodiment illustrated, the substantially cylindrical portion 24 that forms the notched seat that is configured to receive the optical fiber 13 includes a cut-away center section 56, configured and sized to receive the fiber clamping arm 16, thereby securely retaining the optical fiber 13.

Figure 6:
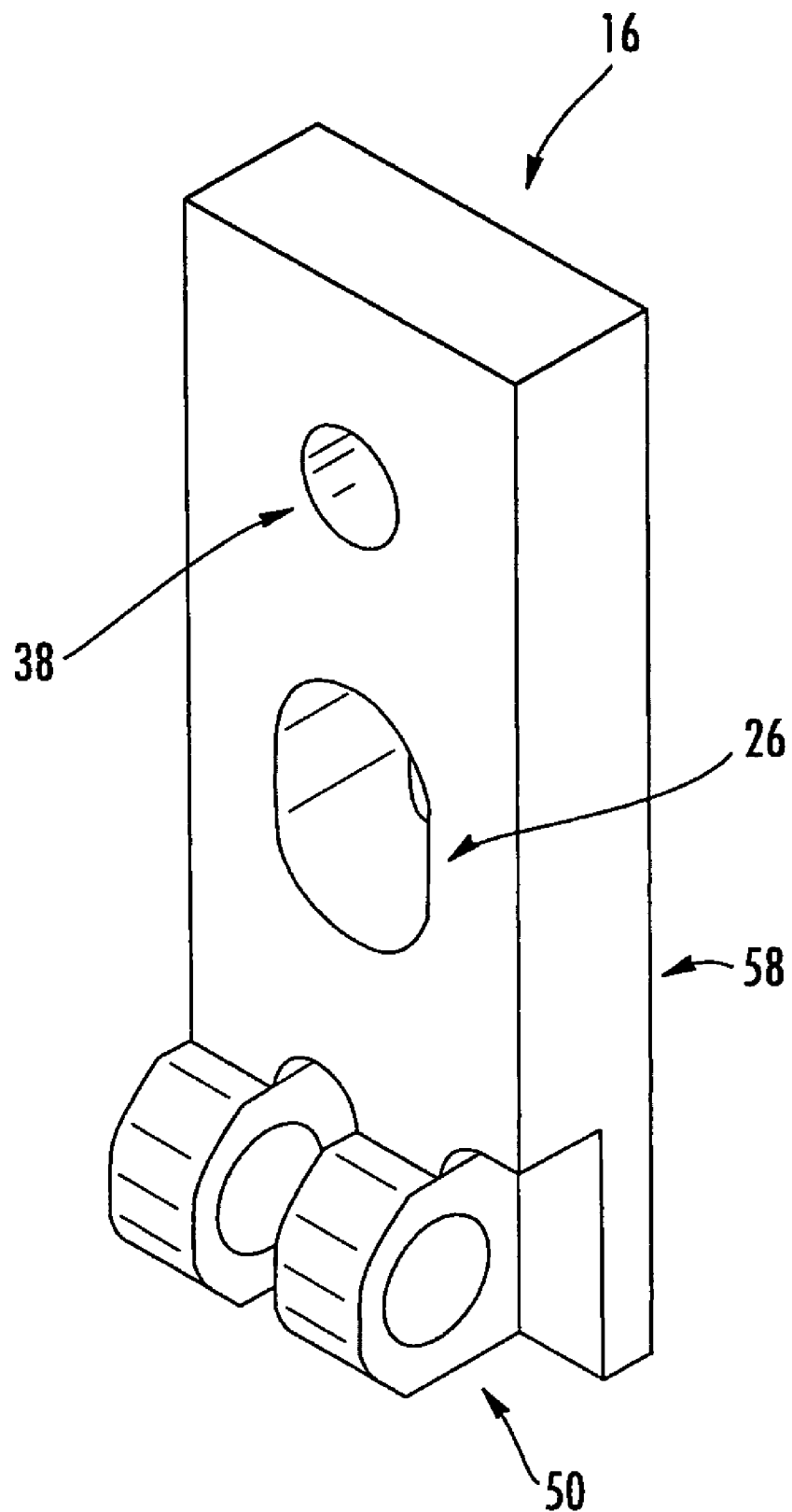
FIG. 6 is an isolated perspective view illustrating one embodiment of the fiber clamping arm associated with the retention and rotation clamp of FIGS. 1-4.

Referring to FIG. 6, the fiber clamping arm 16 of the angled optical fiber cleaver 10 (FIGS. 1-4) of the present invention includes another pair of pin-receiving holes 50 at its lower end, where the fiber clamping arm 16 is hingedly connected to the main clamping arm 18 (FIGS. 1-5) via the pin 52 (FIGS. 2-4). The fiber clamping arm 16 also includes a center portion 58 defining the bore 26 and recess 38 described above.

In other embodiments, the actions performed by the springs described above could be performed by other means, such as by elastomers or the like. Likewise, the clamp mechanism could be replaced with a staged pin that is operated with a single linear motion, successively applying pressure to the fiber clamp, then the main clamp, thereby imparting retention and rotation motion. In general, the present invention contemplates the use of any mechanism that first retains an optical fiber and second rotates the optical fiber with a single linear motion actuated by an actuation mechanism such as a button.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An angled optical fiber cleaver device operable for cleaving an optical fiber and providing an angled optical fiber endface, the angled optical fiber cleaver device comprising:
   a retention and rotation clamp assembly operable for retaining and rotating an optical fiber with a single actuation motion by a user;
   wherein the retention and rotation clamp assembly comprises:
   a fiber clamping arm in a first vertical position when the retention and rotation clamp assembly is in a first actuation state; and
   a main clamping arm in a first angled position away from the fiber clamping arm and away from a body of the angled optical fiber cleaver device when the retention and rotation clamp assembly is in the first actuation state;
   wherein, in the first actuation state, the fiber clamping arm and the main clamping arm are configured to receive the optical fiber; and
   a cleaving assembly operable for cleaving the optical fiber.

2. The angled optical fiber cleaver device of claim 1, wherein the retention and rotation clamp assembly father comprises:
   the fiber clamping arm in a first angled position when the retention and rotation clamp assembly is in a second actuation state; and
   the main clamping arm in the first angled position no longer away from the fiber clamping arm and still away from a body of the angled optical fiber cleaver device when the retention and rotation clamp assembly is in the second actuation state;
   wherein, in the second actuation state, the fiber clamping arm and the main clamping arm are configured to securely retain the optical fiber.

3. The angled optical fiber cleaver device of claim 2, wherein the retention and rotation clamp assembly further comprises:

the fiber clamping arm in a second vertical position when the retention and rotation clamp assembly is in a third actuation state; and the main clamping arm in the first vertical position still no longer away from the fiber clamping arm and no longer away from a body of the angled optical fiber cleaver device when the retention and rotation clamp assembly is in the third actuation state;

wherein, in the third actuation state, the fiber clamping arm and the main clamping arm are configured to rotate the securely retained optical fiber.

4. The angled optical fiber cleaver device of claim 1, wherein the single actuation motion by the user comprises a single linear actuation motion by the user.

5. The angled optical fiber cleaver device of claim 1, wherein the angled optical fiber cleaver device is operable for retaining, rotating, and cleaving the optical fiber.

6. An angled optical fiber cleaver device operable for cleaving an optical fiber and providing an angled optical fiber endface, the angled optical fiber cleaver device comprising:
   a retention and rotation clamp assembly operable for retaining and rotating an optical fiber with a single actuation motion by a user, wherein the retention and rotation clamp assembly comprises:
   a fiber clamping arm disposed adjacent to a main clamping arm in a first vertical position when the retention and rotation clamp assembly is in a first actuation state; and
   a clamp press operable for selectively biasing the fiber clamping arm directly adjacent to a main clamping arm in one of a vertical or angled position; and
   a cleaving assembly operable for cleaving the optical fiber;
   wherein the main clamping arm is in a first angled position away from the fiber clamping arm and away from a body of the angled optical fiber cleaver device when the retention and rotation clamp assembly is in the first actuation state; and
   wherein, in the first actuation state, the fiber clamping arm and the main clamping arm are configured to receive the optical fiber.

7. The angled optical fiber cleaver device of claim 6, wherein the retention and rotation clamp assembly further comprises:
   the fiber clamping arm in a first angled position when the retention and rotation clamp assembly is in a second actuation state; and
   the main clamping arm in the first angled position no longer away from the fiber clamping arm and still away from a body of the angled optical fiber cleaver device when the retention and rotation clamp assembly is in the second actuation state;
   wherein, in the second actuation state, the fiber clamping arm and the main clamping arm are configured to securely retain the. optical fiber.

8. The angled optical fiber cleaver device of claim 7, wherein the retention and rotation clamp assembly further comprises:
   the fiber clamping arm in a second vertical position when the retention and rotation clamp assembly is in a third actuation state; and
   the main clamping arm in the first vertical position still no longer away from the fiber clamping arm and no longer away from a body of the angled optical fiber cleaver device when the retention and rotation clamp assembly is in the third actuation state;

wherein, in the third actuation state, the fiber clamping arm and the main clamping arm are configured to rotate the securely retained optical fiber.

9. The angled optical fiber cleaver device of claim 6, wherein the single actuation motion by the user comprises a single linear actuation motion by the user.

10. The angled optical fiber cleaver device of claim 6, wherein the angled optical fiber cleaver device is operable for retaining, rotating, and cleaving the optical fiber.

11. An angled optical fiber cleaving method for cleaving an optical fiber and providing an angled optical fiber endface, the angled optical fiber cleaving method comprising:
   providing a retention and rotation clamp assembly operable for retaining and rotating an optical fiber with a single actuation motion by a user;
   wherein providing the retention and rotation clamp assembly comprises:
   providing a fiber clamping arm in a first vertical position when the retention and rotation clamp assembly is in a first actuation state; and
   providing a main clamping arm in a first angled position away from the fiber clamping arm and away from a body of the angled optical fiber cleaver device when the retention and rotation clamp assembly is in the first actuation state; and providing a cleaving assembly operable for cleaving the optical fiber.
   wherein, in the first actuation state, the fiber clamping arm and the main clamping arm are configured to receive the optical fiber.

12. The angled optical fiber cleaving method of claim 11, wherein providing the retention and rotation clamp assembly further comprises:
   providing the fiber clamping arm in a first angled position when the retention and rotation clamp assembly is in a second actuation state; and
   providing the main clamping arm in the first angled position no longer away from the fiber clamping arm and still away from a body of the angled optical fiber cleaver device when the retention and rotation clamp assembly is in the second actuation state;
   wherein, in the second actuation state, the fiber clamping arm and the main clamping arm are configured to securely retain the optical fiber.

13. The angled optical fiber cleaving method of claim 12, wherein providing the retention and rotation clamp assembly further comprises:
   providing the fiber clamping arm in a second vertical position when the retention and rotation clamp assembly is in a third actuation state; and
   providing the main clamping arm in the first vertical position still no longer away from the fiber clamping arm and no longer away from a body of the angled optical fiber cleaver device when the retention and rotation clamp assembly is in the third actuation state;
   wherein, in the Third actuation state, the fiber clamping arm and the main clamping arm are configured to rotate the securely retained optical fiber.

14. The angled optical fiber cleaving method of claim 11, wherein the single actuation motion by the user comprises a single linear actuation motion by the user.

15. The angled optical fiber cleaving method of claim 11, wherein the angled optical fiber cleaving method is for retaining, rotating, and cleaving the optical fiber.

* * * * *

UNITED STATES PATENT AND TRADEMARK OFFICE
CERTIFICATE OF CORRECTION

PATENT NO. : 7,539,389 B2
APPLICATION NO. : 12/069244
DATED : May 26, 2009
INVENTOR(S) : Brinson et al.

It is certified that error appears in the above-identified patent and that said Letters Patent is hereby corrected as shown below:

| Col. | Line | Description |
|------|------|-------------|
| 6 | 52 | Please delete "father" and add "further" |

Signed and Sealed this

Twenty-fourth Day of November, 2009

David J. Kappos
*Director of the United States Patent and Trademark Office*